United States Patent
Tong et al.

(10) Patent No.: US 10,607,245 B2
(45) Date of Patent: Mar. 31, 2020

(54) RECOMMENDING VIRTUAL REWARD OFFERS AND AWARDING VIRTUAL REWARDS

(71) Applicant: TAPJOY, INC., San Francisco, CA (US)

(72) Inventors: Linda Tong, San Francisco, CA (US); Stephen James McCarthy, San Francisco, CA (US); Ryan Allen Johns, San Francisco, CA (US); Hai-Van Pham, Milpitas, CA (US); Norman Chan, Belmont, CA (US); Amir Bashir Manji, San Francisco, CA (US); Jia Feng, San Francisco, CA (US); Marc Bourget, Mountain View, CA (US); Joey Pan, Fremont, CA (US); Hwan-Joon Choi, Pleasanton, CA (US)

(73) Assignee: Tapjoy, Inc., San Francisco, CA (US)

( * ) Notice: Subject to any disclaimer, the term of this patent is extended or adjusted under 35 U.S.C. 154(b) by 418 days.

(21) Appl. No.: 14/329,796

(22) Filed: Jul. 11, 2014

(65) Prior Publication Data
US 2014/0324562 A1    Oct. 30, 2014

Related U.S. Application Data

(63) Continuation of application No. 13/350,783, filed on Jan. 15, 2012.

(51) Int. Cl.
*G06Q 30/02* (2012.01)

(52) U.S. Cl.
CPC ..... *G06Q 30/0224* (2013.01); *G06Q 30/0239* (2013.01)

(58) Field of Classification Search
None
See application file for complete search history.

(56) References Cited

U.S. PATENT DOCUMENTS

| 6,360,213 B1 | 3/2002 | Wagstaff et al. |
| 6,594,691 B1 | 7/2003 | McCollum et al. |

(Continued)

FOREIGN PATENT DOCUMENTS

| KR | 10-2007-0022397 A | 2/2007 |
| TW | 200910232 A | 3/2009 |

OTHER PUBLICATIONS

International Search Authoruty, "International Search Report and Written Opinion", application No. PCT/US 11/36209, Applicant: Tapjoy, Inc. dated Aug. 18, 2011, 7 pages.

(Continued)

*Primary Examiner* — Michael J Sittner
(74) *Attorney, Agent, or Firm* — Hickman Palermo Becker Bingham LLP

(57) ABSTRACT

In an embodiment, a method performed by one or more computing devices comprises storing, for one or more marketplace associated applications, interaction information that identifies, for each particular application of said one or more marketplace associated applications, a list of devices that interacted with an instance of the particular application; receiving, from a requesting device, a request for a list of offer eligible applications; determining, based on said interaction information, a set of applications associated with the requesting device; based on said determination of the set of applications associated with the requesting device, sending a list of one or more selected eligible applications to the requesting device.

26 Claims, 5 Drawing Sheets

(56) References Cited

U.S. PATENT DOCUMENTS

| | | | |
|---|---|---|---|
| 7,269,636 B2 | 9/2007 | McCollum et al. | |
| 7,647,252 B2 | 1/2010 | Rampell et al. | |
| 7,698,171 B2 | 4/2010 | Rampell et al. | |
| 7,783,721 B2 | 8/2010 | McCollum et al. | |
| 7,788,139 B2 | 8/2010 | Rampell et al. | |
| 7,848,960 B2 | 12/2010 | Rampell et al. | |
| 8,065,702 B2 | 11/2011 | Goldberg et al. | |
| 2001/0038642 A1 | 11/2001 | Alvarez et al. | |
| 2002/0002488 A1 | 1/2002 | Muyres et al. | |
| 2002/0004742 A1 | 1/2002 | Willcocks et al. | |
| 2002/0077986 A1 | 6/2002 | Kobata et al. | |
| 2002/0095333 A1 | 7/2002 | Jokinen et al. | |
| 2002/0128057 A1 | 9/2002 | Walker et al. | |
| 2002/0128984 A1 | 9/2002 | Mehta | |
| 2002/0147639 A1 | 10/2002 | Williams et al. | |
| 2002/0194064 A1 | 12/2002 | Parry et al. | |
| 2002/0198851 A1 | 12/2002 | Hashimoto et al. | |
| 2003/0032476 A1 | 2/2003 | Walker et al. | |
| 2003/0084439 A1* | 5/2003 | Perkins | G06F 8/61 717/177 |
| 2003/0120542 A1 | 6/2003 | Arning | |
| 2003/0181242 A1 | 9/2003 | Lee et al. | |
| 2004/0098348 A1* | 5/2004 | Kawasaki | G06F 21/10 705/59 |
| 2004/0190448 A1 | 9/2004 | Fishteyn et al. | |
| 2004/0254836 A1 | 12/2004 | Emoke | |
| 2005/0055398 A1 | 3/2005 | Olson | |
| 2005/0289047 A1 | 12/2005 | Oliver et al. | |
| 2006/0004799 A1 | 1/2006 | Wallender | |
| 2006/0259361 A1 | 11/2006 | Barthydt | |
| 2007/0005428 A1 | 1/2007 | Jacobs et al. | |
| 2007/0174115 A1* | 7/2007 | Chieu et al. | 705/14 |
| 2007/0203958 A1 | 8/2007 | Suzuki et al. | |
| 2007/0255576 A1* | 11/2007 | Patterson | G06Q 30/02 705/1.1 |
| 2008/0070690 A1* | 3/2008 | Van Luchene | G07F 17/32 463/42 |
| 2008/0077506 A1 | 3/2008 | Rampell et al. | |
| 2008/0091528 A1 | 4/2008 | Rampell et al. | |
| 2008/0162371 A1 | 7/2008 | Rampell et al. | |
| 2008/0215438 A1 | 9/2008 | Muthugopalakrishnan et al. | |
| 2008/0275786 A1 | 11/2008 | Gluck | |
| 2009/0182589 A1 | 7/2009 | Kendall | |
| 2009/0204626 A1 | 8/2009 | Mustafa | |
| 2009/0216861 A1 | 8/2009 | Shiely et al. | |
| 2009/0292599 A1 | 11/2009 | Rampell et al. | |
| 2010/0205274 A1* | 8/2010 | Gharabally et al. | 709/217 |
| 2010/0211431 A1 | 8/2010 | Lutnick et al. | |
| 2010/0262506 A1 | 10/2010 | Zargahi et al. | |
| 2010/0318611 A1 | 12/2010 | Curtin et al. | |
| 2010/0324983 A1 | 12/2010 | Etchegoyen | |
| 2011/0034712 A1 | 2/2011 | Lin | |
| 2011/0055413 A1 | 3/2011 | Lobsenz | |
| 2011/0119131 A1* | 5/2011 | Levi | G06Q 30/02 705/14.53 |
| 2011/0131089 A1 | 6/2011 | Walker et al. | |
| 2011/0161150 A1 | 6/2011 | Steffens et al. | |
| 2011/0202928 A1* | 8/2011 | Nakano et al. | 718/104 |
| 2011/0208616 A1* | 8/2011 | Gorman | G06Q 30/0641 705/27.1 |
| 2011/0300923 A1* | 12/2011 | Van Luchene | A63F 13/85 463/25 |
| 2011/0307354 A1* | 12/2011 | Erman | G06F 8/60 717/178 |
| 2011/0320307 A1 | 12/2011 | Mehta et al. | |
| 2012/0035990 A1* | 2/2012 | Lewis et al. | 705/14.1 |
| 2012/0036003 A1 | 2/2012 | Tong et al. | |
| 2012/0072871 A1* | 3/2012 | Seo | G06F 8/61 715/838 |
| 2012/0102008 A1* | 4/2012 | Kaariainen | G06Q 30/0201 707/705 |
| 2012/0129503 A1* | 5/2012 | Lindeman | G06F 8/60 455/414.1 |
| 2012/0197716 A1 | 8/2012 | Rampell et al. | |
| 2012/0197717 A1 | 8/2012 | Rampell et al. | |
| 2012/0197730 A1 | 8/2012 | Rampell et al. | |
| 2012/0197731 A1 | 8/2012 | Rampell et al. | |
| 2012/0209668 A1 | 8/2012 | Angelos et al. | |
| 2012/0209908 A1 | 8/2012 | Angelos et al. | |
| 2012/0265595 A1 | 10/2012 | Corner et al. | |
| 2012/0265602 A1 | 10/2012 | Corner et al. | |
| 2012/0265603 A1 | 10/2012 | Corner et al. | |
| 2012/0265604 A1 | 10/2012 | Corner et al. | |
| 2012/0291022 A1* | 11/2012 | Mehta | G06Q 30/0255 717/176 |
| 2013/0035944 A1 | 2/2013 | Pattan et al. | |
| 2013/0035994 A1* | 2/2013 | Pattan et al. | 705/14.4 |

OTHER PUBLICATIONS

Current Claims in application No. PCT/US11/36209, dated Aug. 2011, 6 pages.
Wikipedia article titled "Ping (networking utility)," downloaded on Feb. 15, 2013, 6 pages.
European Patent Office, "Search Report" in application No. PCT/US2013/020163 dated Apr. 29, 2013, 9 pages.
Current Claims in application No. PCT/US2013/020163, dated Apr. 2013, 3 pages.
European Patent Office, "Search Report" in application No. 11815356.8 1955, dated Mar. 12, 2014, 6 pages.
European Patent Office, "Search Report" in application No. 11814933.5—1955, dated Mar. 12, 2014, 6 pages.
Current Claims in application No. 11814933.5, dated Mar. 2014, 4 pages.
Current Claims in application No. 11815356.8—1955, dated Mar. 2014, 4 pages.
Taiwan Patent Office, "Office Action" in application No. 102101385, dated Dec. 17, 2014, 8 pages.
Claims in Tawian Application No. 102101385, dated Dec. 2014, 3 pages.
Claims in Canadian Application No. 2,807,473, dated Oct. 2014, 4 pages.
Canadian Intellectual Property Office, "Office Action" in application No. 2,807,473, dated Oct. 2, 2014, 3 pages.
Claims in Canadian case 2,807,481 dated Feb. 2015, 6 pages.
Canadian Intellectual Property Office, "Office Action" in application No. 2,807,481, dated Feb. 12, 2015, 3 pages.
European Patent Office, "Search Report" in application No. 13736324.8—1955, dated Aug. 4, 2015, 7 pages.
European Claims in application No. 13736324.8—1955, dated Aug. 2015, 3 pages.
The State Intellectual Property Office of The People's Republic of China, "The First Office Action" in application No. 201180044117.4, dated Aug. 13, 2015, 19 pages.
Claims in China Application No. 201180044117.4, dated Aug. 2015, 6 pages.
The State Intellectual Property Office of the People's Republic of China, "The Second Office Action" in application No. 201180044117.4, dated Feb. 15, 2016, 3 pages.
Claims in China application No. 201180044117.4, dated Feb. 2016, 7 pages.
Canadian Intellectual Property Office, "Search Report" in application No. 2,807,481, dated Feb. 15, 2016, 5 pages.
Canadian Claims in application No. 2,807,481, dated Feb. 2016, 6 pages.
U.S. Appl. No. 13/106,051, filed May 12, 2011, Notice of Allowance, dated Jul. 9, 2015.
U.S. Appl. No. 13/350,783, filed Jan. 15, 2012, Office Action, dated Oct. 1, 2014.
U.S. Appl. No. 13/198,809, filed Aug. 5, 2011, Final Office Action, dated Mar. 9, 2015.
Tong, U.S. Appl. No. 13/198,809, filed Aug. 5, 2011, Interview Summary, dated Jan. 29, 2018.

* cited by examiner

RECOMMENDING VIRTUAL REWARD OFFERS AND AWARDING VIRTUAL REWARDS

PRIORITY CLAIM/CROSS-REFERENCE TO RELATED APPLICATION

This patent application is a continuation of co-pending U.S. patent application Ser. No. 13/350,783, filed Jan. 15, 2012, entitled "Recommending Virtual Reward Offers and Awarding Virtual Rewards," the entire contents of which are hereby incorporated by reference as if fully set forth herein.

TECHNICAL FIELD

Embodiments relate to the field of delivering online advertisements to computing devices such as mobile computing devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Advertisements have been delivered over online networks to user devices. One method for delivering advertisements is to interrupt the delivery of online content with an advertisement. For example, a website that streams online music may interrupt its stream to deliver an advertisement.

Advertisers may benefit by providing more compelling incentives for users to receive advertisements. In addition, advertisements would be more effective if their delivery caused a greater amount of involvement. The users may benefit by receiving better targeted advertisements and incentives and more rewarding incentives.

SUMMARY OF THE INVENTION

The appended claims serve to summarize the invention.

DESCRIPTION OF EXAMPLE EMBODIMENTS

Methods for recommending virtual reward offers and awarding virtual rewards are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Linking a Device to a Marketplace Account
4.0 Recommending Virtual Reward Offers
   3.1 Determining Reward Eligible Applications
   3.2 Selecting Rewarding Application
   3.3 Determining Eligible Offers
   3.4 Selecting Rewarding Offer
5.0 Awarding Virtual Rewards
6.0 Implementation Mechanisms—Hardware Overview
7.0 Extensions and Alternatives 1.0 General Overview Recommending virtual reward offers and awarding virtual rewards are described. In an embodiment, a method performed by one or more computing devices comprises storing interaction information for one or more marketplace associated applications and the interaction information identifies, for each particular application of said one or more marketplace associated applications, a list of devices that interacted with an instance of the particular application. A list of offer eligible applications is received from a requesting device. Based in part on the interaction information, a set of applications associated with the requesting device are determined. Based in part on the determination of the set of applications associated with the requesting device, a list of one or more selected eligible applications are sent to the requesting device.

In another embodiment a non-transitory computer-readable storage medium comprises one or more sequences of instructions which when executed by one or more processors cause the one or more processors to perform: storing, for one or more marketplace associated applications, interaction information that identifies, for each particular application of said one or more marketplace associated applications, a list of devices that interacted with an instance of the particular application; receiving, from a requesting device, a request for a list of offer eligible applications; determining, based on said interaction information, a set of applications associated with the requesting device; based on said determination of the set of applications associated with the requesting device, sending a list of one or more selected eligible applications to the requesting device.

In other embodiments, the invention encompasses a computer apparatus configured to carry out the processes described herein.

2.0 Structural and Functional Overview

Figure 1:
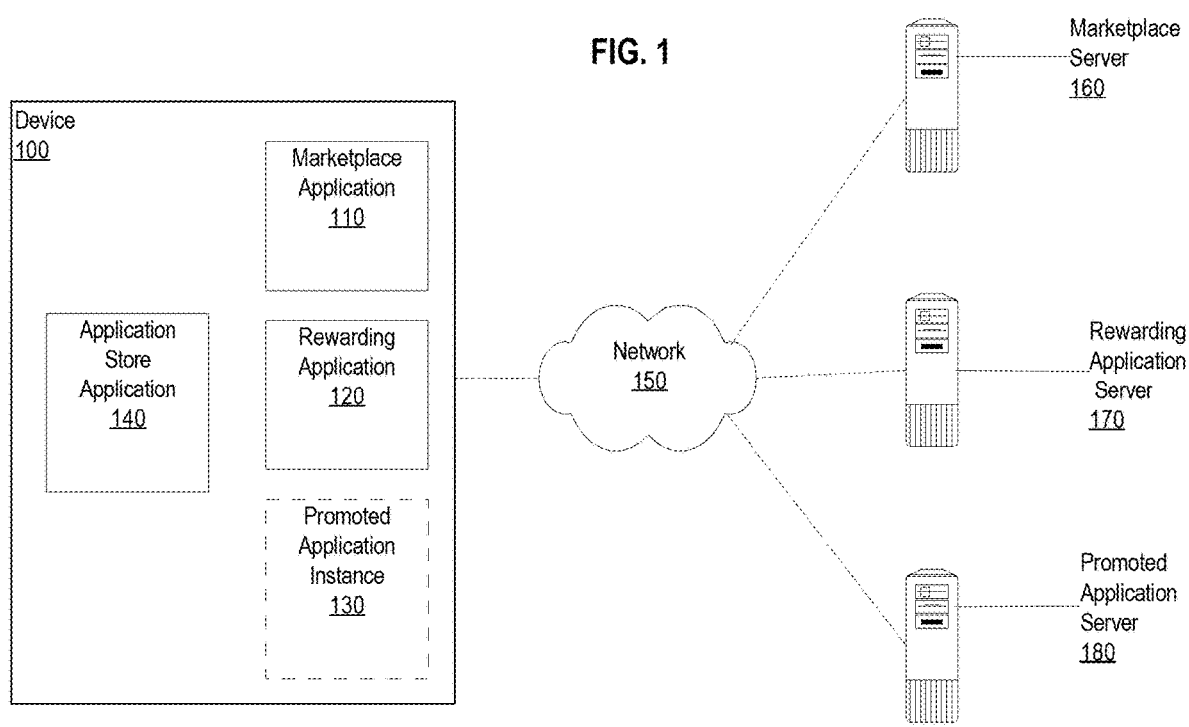
FIG. 1 illustrates an example network upon which embodiments may be implemented.

FIG. 1 illustrates an example network upon which embodiments may be implemented.

Device 100 is communicatively coupled to network 150. In various embodiments, device 100 is a smartphone, tablet computer, a portable computing device, or a personal computer. For purposes of illustrating a clear example, FIG. 1 illustrates one device 100 but in practice embodiments may be implemented using any number of devices, and embodiments involving thousands or millions of devices may be implemented.

Marketplace server 160, rewarding application server 170, and promoted application server 180 are communicatively coupled to network 150. Device 100 may communicate with marketplace server 160, rewarding application server 170, and promoted application server 180 through network 150. Each of the servers 160, 170, 180 may be implemented using a server-class computer or other computer having one or more processor cores, co-processors or other computers. In one embodiment, marketplace server 160, rewarding application server 170, and promoted application server 180 are implemented as one server, or one server computer hosting one or more applications that implement the functions described herein for the marketplace server, rewarding application server, and promoted application server. For purposes of illustrating a clear example, network 150 is shown as a single element, but in practice network 150 may comprise one or more local area networks, wide area networks, and/or internetworks. In one embodiment, network 150 is an Internet network.

Marketplace application 110, rewarding application 120, application store application 140, and promoted application instance 130 may be computer program applications that run on device 100 and implement the functions and processes that are further described herein. Each of marketplace application 110, rewarding application 120, and application store application 140 may be run within a web browser that device 100 hosts, or may be downloaded and installed on the device.

3.0 Linking a Device to a Marketplace Account

The following functional description requires no particular hardware, operating system, software system, or other detail for an implementation. Additionally, the flow diagrams presented are examples of possible algorithmic flow and in no way limit the scope of the invention. Embodiments of the invention can be practiced in many ways in many disparate hardware and software environments and using different algorithmic flows.

Figure 2:
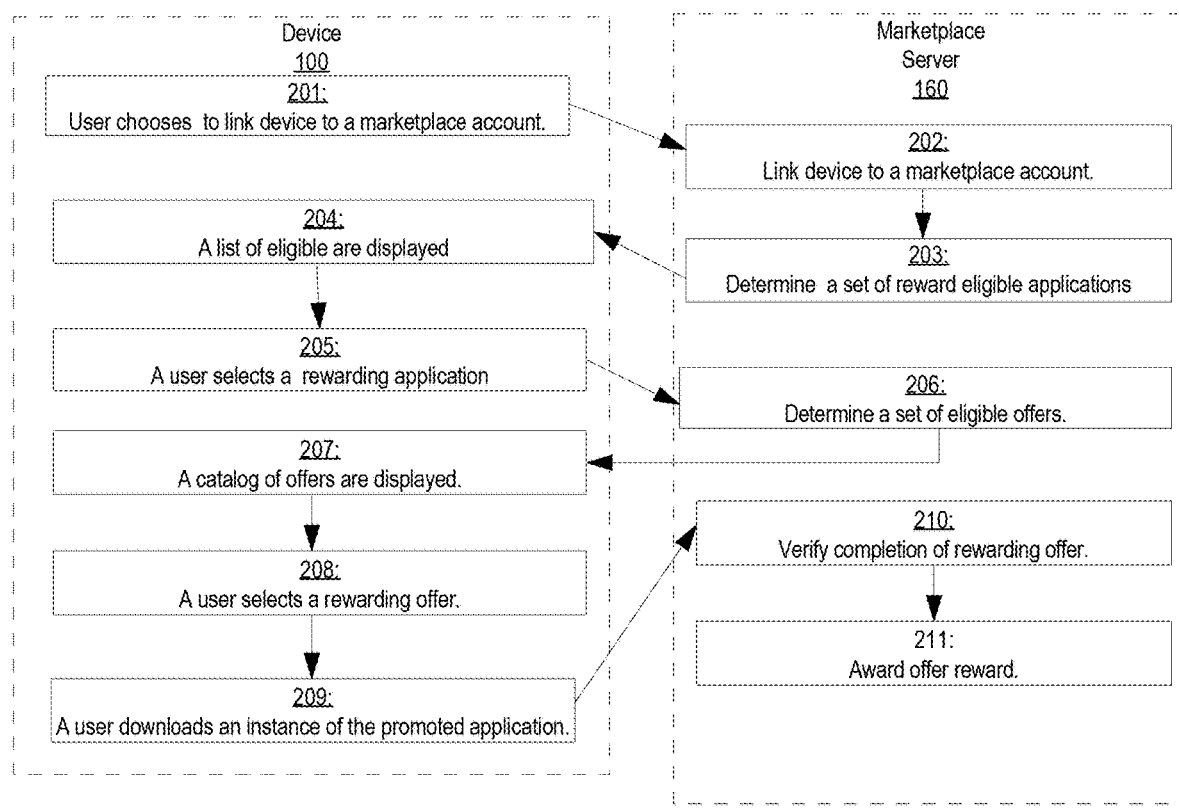
FIG. 2 illustrates a flow diagram illustrating an example of steps that may be performed by a device and a marketplace server.

FIG. 2 illustrates a flow diagram illustrating an example of processes that may be performed by a device and a marketplace server. In one embodiment, the processes are performed by device 100 and marketplace server 160 illustrated in FIG. 1.

At block 201, a user chooses to link device 100 to a marketplace account. A device is linked to a marketplace account if the account information for the marketplace account lists the device as an associated device. In one embodiment, the user is prompted to link a device to a marketplace account. In one embodiment, the user is prompted to link a device to a marketplace account in response to a marketplace server receiving a request for eligible applications and the marketplace server determining that the requesting device is not linked to any marketplace account.

In an embodiment, in response to determining that the requesting device is not linked to any marketplace account, the marketplace server may prompt a user of the requesting device to perform a particular action that may cause the device to be linked to a marketplace account. The user may be prompted to download a marketplace application or allow a device linking module to be installed on the requesting device. In an embodiment, in response to determining that the requesting device is not linked to any marketplace account, the marketplace server may determine which operating system the requesting device runs. In response to determining the requesting device's operating system, the marketplace server selects whether to prompt the user to download an application or to prompt the user to download the device linking module.

In an embodiment, device 100 sends a device link request to marketplace server 160. In an embodiment, the device link request is sent by marketplace application 110. In another embodiment, a link requesting device (not pictured) that is different from device 100 may send a device link request to marketplace server 160 requesting to link the device to a marketplace account. The device link request from the link requesting device may identify a marketplace account to which device 100 is to be linked. The device link request from the link requesting device may also be comprised of a device identifier identifying device 100. In an embodiment, if the device link request does not comprise a device identifier, the user is prompted to perform a particular action that may cause the device to be linked. The user may be prompted to download a marketplace application or allow a device linking module to be installed on the requesting device.

The device link request sent by device 100 may indicate that the device is the device that is to be linked to a marketplace account. The device link request may be comprised of a device identifier that identifies device 100. The device identifier of a device can be determined in a number of different ways. In an embodiment, a marketplace application installed on device 100 may determine a device identifier for the device. In another embodiment, a device linking module may be installed onto device 100 once the user of device 100 grants permission. The device linking module may modify the permission of device 100 to allow marketplace server to determine the device identifier of device 100. In an embodiment, the device linking module is a provisioning profile.

The device link request may comprise a marketplace account identifier identifying a single marketplace account. In an embodiment, the device link request is sent after a user logs into a marketplace account through a marketplace application. During the login process, the user may enter login information that uniquely identifies a particular marketplace account. For example, the user may provide an e-mail address as login information and a password as authentication information. In other embodiments, a user identifier other than an e-mail address may be used. In an embodiment, each user identifier is to be associated with, at most, a single marketplace account. In other embodiments, each user identifier may be associated with multiple marketplace accounts. In an embodiment, if the user has already logged into a marketplace account, the device link request may comprise marketplace account identifier that identifies the account that the user is logged into.

In an embodiment, a new marketplace account is created in response to receiving a device link request that does not identify a marketplace account. The device that is to be linked may then be linked to the new marketplace account.

At block 202, in response to receiving the device link request, marketplace server 160 links device 100 to a marketplace account. Linking may comprise updating a database record at the marketplace server to record a device identifier. The marketplace account that the device is linked to may be the account identified in the device link request. Marketplace server 160 updates a list of devices associated with a marketplace account to include the device. In one embodiment, a marketplace account has a device list listing the device identifiers of the devices associated with the account. Marketplace server 160 may add a device identifier identifying device 100 to the device list.

In one embodiment, each device may only be linked to a single marketplace account. In other embodiments, a device may be linked to multiple marketplace accounts. Marketplace server 160 may first determine whether device 100 has already been linked to a different marketplace account. If it is determined that device 100 is already linked to another account, the device link request may be rejected.

Figure 4:
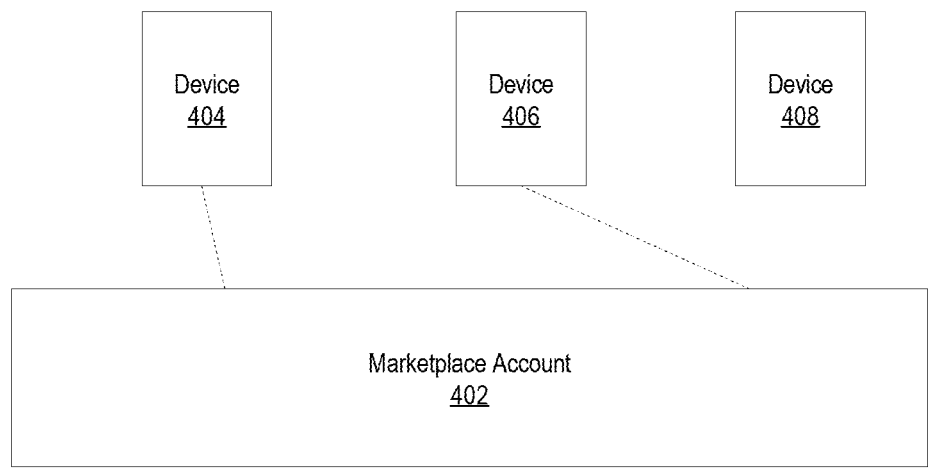
FIG. 4 illustrates one example of a marketplace account and linked devices.

In one embodiment, multiple devices may be linked to the same marketplace account. FIG. 4 illustrates one example of a marketplace account and linked devices. Devices 404, 406 are linked to marketplace account 402. Device 408 is not linked to marketplace account 402. In an embodiment, any of devices 404, 406, 408 may also be used to modify account information for marketplace account 402, including an un-linked device such as device 408. In some embodiments, a user of an un-linked device may only modify account information associated with a marketplace account if a user first logs into a marketplace account using the marketplace application of the un-linked device.

3.1 Determining Eligible Applications

At block 206, marketplace server 160 determines a set of eligible applications for device 100. Each application in the set of eligible applications may be an application that a user of device 100 can select to earn virtual rewards for use in that application. In one embodiment, marketplace server 160 determines the set of eligible applications in response to receiving a request for eligible applications from marketplace application 110. Marketplace application 110 may have generated the request for eligible applications in response to the user selecting a hyperlink displayed by the marketplace application. In another embodiment, a marketplace server determines the set of eligible application for a particular device in response to the particular device being linked to a marketplace account. In an embodiment, the set of eligible applications for a particular device are determined based, in part, on the prior applications that have been executed on the particular device.

In one embodiment, marketplace server 160 determines a set of eligible applications based on a set of device-associated applications. The set of device-associated applications may be determined based on a set of interaction tables where each interaction table is associated with an application.

In an embodiment, marketplace server 160 has access to the interaction tables associated with each of a set of applications. In one embodiment, an entry is added to an interaction table associated with a particular application each time a device interacts with an instance of the particular application or a server associated with the particular application. The entry may comprise a device identifier identifying the device that interacted with an instance of the application or the application server. The interaction entry may further comprise a timestamp indicating the time at which the interaction occurred. The entry may also comprise a value indicating the type of interaction that occurred. For example, in a particular interaction table that stored entries describing different types of interactions, one entry may indicate that a particular application was executed at 12:35 PM on November 3 by a device with a device identifier of 345. The next entry of the interaction table may indicate that an interaction occurred with an instance of the particular application was at 12:37 PM on November 3 by a device with a device identifier of 239.

The type of interactions that trigger the creation of an interaction table entry may vary with different embodiments. For example, in one embodiment entries may be added to the interaction table of a particular application only when an instance of the particular application is executed. In another embodiment, entries may be added to the interaction table of a particular application each time an instance of the particular application is downloaded and each time an instance of the particular application is executed. In another embodiment, entries may be added to the interaction table of a particular application each time a user creates an account with the particular application.

An interaction table may be stored on a server associated with the particular application or on a marketplace server. For example, marketplace server 160 may store the interaction table associated with rewarding application 120 or rewarding application server which is associated with rewarding application 120 may store the interaction table.

In an embodiment, marketplace server 160 stores an interaction table comprised of execution entries, where each execution entry represents a particular occurrence of the particular associated application being executed. In an embodiment, a server associated with the application sends a notification to marketplace server 160 each time an instance of the particular application is executed. In response to receiving the notification, marketplace server 160 may store an execution entry in the interaction table associated with the particular application.

In an embodiment, in response to receiving a request for eligible applications, marketplace server 160 determines a set of device-associated applications with which device 100 has already been associated. This determination is made based on one or more interaction tables. In an embodiment, each interaction tables associated with a set of applications are searched for a device identifier identifying device 100. In one embodiment, for each application for which there is an entry identifying device 100 in the application's associated interaction table, the application is included in the set of device-associated applications for device 100.

In one embodiment, the interaction tables are searched for only the device identifier of the requesting device, device 100. In another embodiment, the interaction tables are searched for the device identifiers of device 100 or the device identifiers of any of the devices linked to the marketplace account of device 100.

In embodiments, marketplace server 160 may search for entries indicating that an interaction of a particular type occurred. For example, in one embodiment, an application may only be deemed a device-associated application for a device if the device has previously executed an instance of the application. In addition, one or more interaction tables that are searched may include entries representing interactions other than just executions. Thus, marketplace server 160 may search only for entries that both represent an execution of the application and comprise a device identifier identifying device 100. In other embodiments, an application may be deemed a device-associated application for a device if the device has previously downloaded an instance of the application. In such an embodiment, marketplace server 160 may search only for entries that both represent a download of an instance of the application and comprise a device identifier identifying device 100.

In an embodiment, for each particular application of a set of applications, the marketplace server 160 searches the interaction table associated with the particular application for entries indicating that device 100 executed or downloaded an instance of the particular application.

In an embodiment, marketplace server 160 searches the execution table for each application of a set of applications. Within each execution table, marketplace server 160 searches for the device identifier of device 100. For each execution table that is comprised of an entry with the device identifier of device 100, the respective application of the execution table is included in the set of device-associated applications for device 100.

In some embodiments where interaction tables are searched for not only identifiers identifying the requesting device but also identifiers identifying other devices linked to the requesting device's account, the marketplace server 160 may determine which devices are linked to the account of the requesting device before searching the interaction tables. This determination may occur in a variety of different ways. In one embodiment, the request for eligible applications sent by the marketplace application may include a marketplace account identifier that identifies the requesting device's marketplace account. In another embodiment, the marketplace server 160 may look up the requesting device's account information by using the requesting device's device identifier as a search key. The located account information may include the device identifiers of the other devices linked to the account of the requesting device.

At block 203, marketplace server 160 determines a set of eligible applications. In an embodiment, a user of device 100 may earn virtual rewards for any application in the set of eligible applications. The set of eligible applications may be determined based on the set of device-associated applications for device 100. In one embodiment, the set of eligible applications is the set of device-associated applications. In another embodiment, the set of eligible applications is a subset of the set of device-associated applications. In one embodiment, an application is selected for the set of eligible applications only if the application is a reward registered application and the application has been executed on the requesting device or another device linked to the requesting device's account. A reward registered application is an application whose publisher has agreed to award a virtual reward for use with the application. Examples of virtual rewards may include virtual currency or a virtual good. Marketplace server 160 may send an eligible applications message to marketplace application 110 of device 100 identifying the applications in the set of eligible applications.

3.2 Selecting Reward Applications

At block 204, an eligible applications list is displayed on device 100. In an embodiment, the eligible applications list is displayed by marketplace application 110. In an embodiment, each element in the eligible applications list represents an application in the set of eligible applications identified in the eligible applications message. The list of eligible applications may represent applications for which the user may choose to gain virtual rewards.

At block 205, a user selects a particular rewarding application from the list of eligible applications. In one embodiment, if the rewarding application is not already installed on device 100, application store application 140 may cause a download page for downloading the rewarding application to display on the device. The download page may include a hyperlink for downloading rewarding application 120. In response to the user's selection, marketplace application 110 notifies marketplace server 160 of the user's selection.

3.3 Determining Eligible Offers

Marketplace server 160 receives a notification indicating that the selected application has been selected by a user to be the rewarding application. At block 206, based on the selected rewarding application, marketplace server 160 determines a set of eligible offers for gaining virtual rewards in the selected rewarding application. The set of eligible offers may be a list of offers that are recommended to a user for gaining virtual rewards.

In an embodiment, eligible offers in the set are chosen from a set of registered offers. For each registered offer, an advertiser has agreed to give some form of consideration in exchange for the performance of an offer action. In one embodiment, the consideration is a payment. An advertiser payment rate is the amount of consideration the advertiser of the registered offer has agreed to give for a performance of an offer action. An offer action is the action the user must perform for the advertiser to give the advertiser payment rate. For example, the offer action of a particular offer may be to watch a streaming video advertisement online and the advertiser may agree to pay 10 cents or provide some other consideration for each occurrence of the offer action.

In an embodiment, one or more offers of the set of registered offers are application promotion offers. The offer action of an application promotion offer requires the user to perform some action in connection with a promoted application that is to be downloaded on to a user device. Examples of application promotion offers include offers requiring a user to execute the promoted application or to download the promoted application and create an account using the promoted application. One example of an application promotion offer is an advertiser agreeing to pay 50 cents for every time a user downloads the promoted application.

One or more registered offers may be associated with further limitations. For example, for a registered offer that requires the execution of a promoted application, the offer may also require that the application not have been executed before on the device.

In one embodiment, the set of registered offers chosen to be eligible offers may differ depending on which application has been selected to be the rewarding application. In one embodiment, some registered offers may be deemed unselectable for some reward application. In one embodiment, marketplace server 160 may store a set of un-selectable applications for one or more rewarding applications. In an embodiment, the set of eligible applications for a rewarding application are determined by selecting all applications in the set of eligible applications that are not in the set of unselectable applications associated with the rewarding application.

In one embodiment, a registered offer may not be chosen to be in the set of eligible offers because the offer action has already been performed by the requesting device or the requesting account. For example, a particular registered offer may require a user to execute a promoted application. Marketplace server 160 may determine, based on an interaction table associated with the promoted application, that device 100 or another device linked to device 100's account has already executed the promoted application. Thus, the particular registered offer may not be selected to be an eligible offer.

In one embodiment, device information about device 100 or the account information associated with the device's account affects which offers are selected as eligible offers. For example, a user may have entered account information indicating her geographic location. In addition, one or more advertisers may have restricted an offer to be made available only in a particular country. In an embodiment, marketplace server 160 does not select any offers for the set of eligible offers that are associated with a location restriction that is not satisfied based on the account information. For example, an advertiser may have registered an offer with the limitation that the offer be available to users with devices registered in the United States. When the marketplace server 160 determines a set of eligible requests for a user whose account information indicates the user's location to be outside the United States, marketplace server 160 may not choose the registered offer to be in the set of eligible offers for the user. In this context, as an example, if the user has an account or phone registered in the US but goes to Asia and does not change the phone location, the user may be deemed to be in the US even though they may currently be outside of the US.

In one embodiment, marketplace server 160 does not select the registered offer for any account with account information indicating that the user is located in a location other than the United States. In another embodiment, marketplace server 160 does not select the registered offer for any account with account information indicating that the user is located in a location other than the United States or for any account that does not list a location.

In other embodiments, a user may have entered information regarding his favorite categories or categories that he does not wish to receive offers for. In an embodiment, marketplace server 160 may compare information about a particular registered offer with preference information associated with the particular marketplace account of device 100 to determine which offers should be chosen as eligible offers.

Marketplace server 160 may access account information associated with the marketplace account of device 100 in a variety of ways. In one embodiment, the notification of a rewarding application selection may indicate the marketplace account of device 100. In an embodiment, marketplace server 160 may look up information about the marketplace account of device 100 by using the device identifier as a search key.

In one embodiment, the determination of which offers to select as eligible offers may be based on the operating system of device 100 or the operating systems of other devices linked to the account of device 100. The operating system of the device 100 may be indicated in the request for eligible offers. Alternatively, the stored account information associated with device 100 may indicate the operating systems that the device runs or other associated devices run. A particular registered offer may only be compatible on some operating systems, thus the registered offer may be associated with a constraint on the operating system of the requesting device or the account of the requesting device. For example, a particular registered offer may require an offer action of the user executing a particular promoted application. The particular promoted application may only be compatible with a particular operating system. Thus, the registered offer may be associated with a constraint that the requesting device or another device linked to the requesting device's account must operate on the particular operating system. Marketplace server 160 may compare operating system information about device 100 or other devices linked to device 100's marketplace account to the constraint and determine that the constraint of the registered offer is not satisfied. Thus, the particular registered offer may not be selected as an eligible offer.

In one embodiment, marketplace server 160 determines an offer value for each eligible offer based in part on the amount of consideration that the advertiser has agreed to pay in exchange for the performance of the offer action. In one embodiment, marketplace server 160 indicates a ranking for each eligible offer in the set of eligible offers based on rank. The ranking may occur based on a variety of different criteria. In one embodiment, the eligible offers may be ranked based, in part, on the offer value associated with the eligible offer. The offers with a greater offer value may be assigned a higher rank. For example, if the offer value of a first registered offer is 2 Dollars of ABC Cash, and the offer value of the second registered offer is 1 Dollar of ABC Cash, the first registered offer may be assigned a higher rank value.

In another embodiment, the determination of the rank of an eligible offer may be based on the category to which the eligible offer belongs and the category with which the rewarding application is associated. For example, an eligible offer may be given a higher rank value if it is associated with the same category as the rewarding application. For example, there may be an offer action that requires the user to express approval (for example, select a "like" link) for a particular pet store on a social networking site. The particular offer may be assigned to the Pets category. In addition, the user may have chosen the application PuppyLover to be the rewarding application, which has also been assigned to the Pets category. Based on the determination that both the eligible offer and the rewarding application are assigned to the same category of Pets, the marketplace server 160 may rank the particular offer to "like" the Pet Store higher than another offer in a different category.

In another embodiment, the ranking of an eligible offer may be determined based on account information associated with the account of the requesting device. For example, a particular offer may be associated with a preference for a particular geographic region. If the account information of the requesting account indicates that the account user is located in the same geographic region as the particular geographic region listed in the preference, the particular offer may be assigned a higher rank value than offers that have not been targeted to any particular geographic region or have been targeted to a different geographic region.

In another embodiment, the determination of the rank may be based in part on other account information associated with the requesting device. Other types of account information may include a variety of information that a user may choose to provide for purposes of receiving more relevant offers. Examples of other types of account information include favorite categories of the user, the gender of the user, and the age of the user. For example, if a user has indicated Movies as a favorite category, an offer that is also associated with the Movies category may be assigned a greater rank than an offer of a category that has not been listed as a favorite category. As another example, marketplace server 160 may assign a lower rank to offers that belong to a category in which the user has indicated a lack of interest. The ranking of eligible offers may also be based on other account information that the user has chosen to share.

The ranking of eligible offers may also be based on publicly available information about the offers. Examples of publicly available information may include reviews about the offer or ratings of the offers. For example, an offer to download a particular application may be assigned a relatively high rank if the particular application has received a lot of good reviews.

3.4 Selecting Rewarding Offers

In one embodiment, marketplace server 160 sends a message to marketplace application 110 describing the offers that have been determined to be eligible offers. In an embodiment, the message describes the offer value and offer action of an offer. The message may describe a plurality of offers and the message may also indicate a ranking for the plurality of offers.

Figure 3:
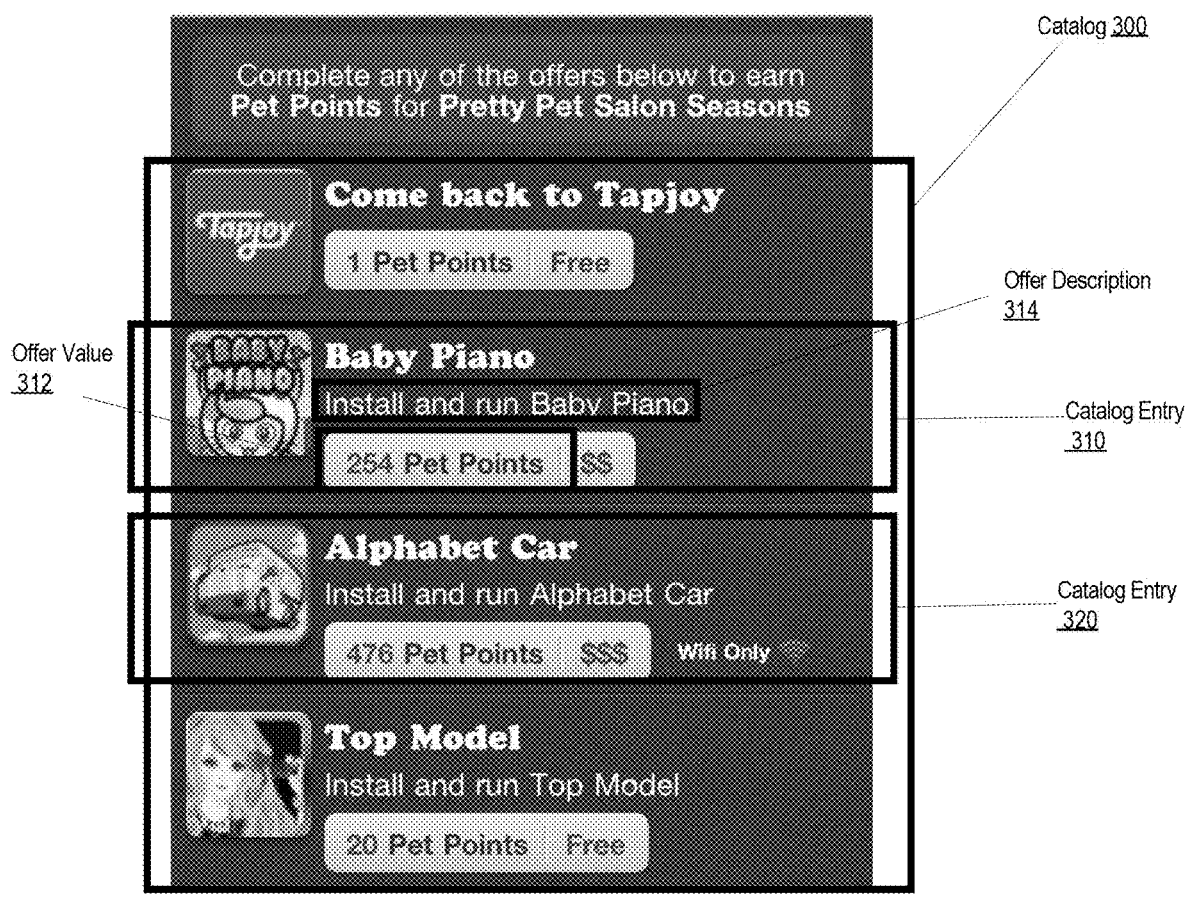
FIG. 3 illustrates one example of a catalog of offers.

At block 207, marketplace application 110 displays a catalog of offers. FIG. 3 illustrates one example of a catalog of offers. Catalog 300 is comprised of catalog entry 310 and catalog entry 320. Each catalog entry represents an offer from the set of eligible offers. Offer description 314 describes the offer action associated with the eligible offer represented by catalog entry 310. Offer value 312 describes the offer value associated with the eligible offer represented by catalog entry 310. In one embodiment, catalog entries 310, 320 are ordered according to the rankings of the respective offers as indicated by the message received from marketplace server 160.

At block 208, a user selects a particular eligible offer as the rewarding offer. In an embodiment, the user causes the selection by clicking on a hyperlink within a particular entry of a catalog that represents the selected offer. In one embodiment, the selection of the hyperlink causes a page containing a link for downloading the offered application to load. In one embodiment, the associated offer action of the selected offer requires the user to download promoted application instance 130.

In an embodiment, in response to the selection of the rewarding offer, marketplace application 110 sends an offer selection notification to marketplace server 160 indicating that device 100 has selected a particular offer. In an embodiment, the notification identifies the promoted application of the selected offer. In one embodiment, the offer selection notification identifies the selection device upon which the selection occurred. The offer selection notification may also indicate the time at which the offer was selected. The offer selection notification may also identify the rewarding application that was selected. The offer selection notification may also indicate the amount of the virtual reward to be awarded for the completion of the offer.

In an embodiment, application store application 140 causes device 100 to display a download page for the promoted application of the selected offer that includes an option for downloading promoted application instance 130. The option may comprise a hyperlink, button, or some other graphical user interface (GUI) object. The display of the download page may occur in response to the selection of the application promotion offer that promotes the promoted application.

At block 209, the user executes promoted application instance 130, an instance of the promoted application onto device 100. In one embodiment, each time an instance of the promoted application is executed, an entry is stored in an execution table that identifies the device upon which the application instance was executed. The entry may also identify the time of the execution.

In one embodiment, promoted application server 180 stores an interaction table for the promoted application and adds an entry to the execution table when promoted application instance 130 is executed. In another embodiment, marketplace server 160 stores the interaction table for the promoted application, and promoted application server 180 sends a notification to marketplace server 160 indicating that device 100 executed an instance of the promoted application instance 130. Marketplace server 160 then adds an entry to the execution table indicating device 100's execution of promoted application instance 130. In an embodiment, promoted application instance 130 may comprise a notification module. The notification module may be programmed to send a notification indicating that promoted application instance 130 has been executed each time the application instance is executed.

In one embodiment, promoted application server 180 stores the interaction table associated with the promoted application. Promoted application instance 130 may send a notification to promoted application server 180 when promoted application instance 130 is executed. In response to receiving the execution notice, promoted application server 180 may add an entry to the execution table.

In another embodiment, marketplace server 160 stores the interaction table for the promoted application. Promoted application instance 130 may send a notification regarding the execution to marketplace server 160 when promoted application instance 130 is executed and marketplace server 160 may add an entry to the promoted application's interaction table. Alternatively, promoted application instance 130 may send the execution notification to promoted application server 180. Promoted application server 180 may then notify marketplace server 160 about the execution of promoted application instance 130. Marketplace server 160 may then add an entry to the promoted application's execution table.

4.0 Awarding Virtual Rewards

At block 210, marketplace server 160 determines that the rewarding offer has been completed. The completion of the offer is verified by searching an interaction table of the selected promoted application identified by the offer selection notification. The interaction table of the selected promoted application is searched for a device identifier identifying the device 100. If there is such a particular entry found in the execution table, marketplace server 160 determines that the promoted application was executed and the offer was completed.

In one embodiment, the offer action may require that the execution occur within a predetermined amount of time. Marketplace server 160 may also check the timestamps associated with entries of the interaction to ensure that the execution occurred after the offer was selected and that the execution occurred within the predetermined amount of time from the offer selection.

In other embodiments, marketplace server 160 may verify the completion of a different type of offer than one requiring the offer action of executing a promoted application. The completion of such an offer may be verified by checking an interaction table of the promoted application for an entry indicating that the offer action of the offer was performed.

At block 211, marketplace server 160 causes the virtual of the completed offer to be awarded.

In one embodiment, awarding the offer comprises updating a balance value. The balance value may be an application specific balance value that is associated with a particular rewarding application. The application specific balance value may indicate the amount of an application specific reward that is available for redemption with the particular rewarding application. According to some embodiments, the universal virtual balance may be expressed in a virtual currency, virtual goods, or other units.

In another embodiment, the balance value may indicate an amount of universal virtual balance available for redemption. The universal virtual balance may be redeemable in a plurality of different marketplace applications.

In an embodiment, a reward that is earned using a particular user device is awarded to the marketplace account of the user device. In an embodiment, each marketplace account is only associated with a single universal balance value and at most one application specific balance value for each marketplace application.

In an embodiment, a plurality of devices are linked to the same particular marketplace account are rewards earned on each of the user devices are awarded the particular marketplace account. For example, referring again to FIG. 4, users of each of both devices 404, 406 may complete reward offers. The completions of each reward offer may cause an update to a single universal balance value associated with marketplace account 402. In an embodiment, the rewards associated with marketplace account 402 may be redeemed in either of the linked devices 404 or 406.

In one embodiment, a reward offer may be earned on a particular device for a rewarding application that is not installed on the particular device but is installed on a different device that is linked to the particular device's account. For example, device 404 may request a list of eligible applications. A particular application that has only been installed on device 406 and not on device 404 may be included in the set of eligible applications. A user of device 404 may then select the particular application as the rewarding application, and complete an offer for the rewarding application using that device.

In one embodiment, the universal balance values are stored on marketplace server 160. One or more application specific balance values may also be stored in marketplace server 160. In an embodiment, a server of a rewarding application stores the balance value for the rewarding application.

For example, referring to FIG. 1, rewarding application server 170 may store a balance value for rewarding application 120. In one embodiment, marketplace server 160 notifies the rewarding application server 170 of an offer completion. The offer completion notification may comprise a device identifier that identifies device 100 as the device that performed the offer action. The offer completion notification may also indicate the offer value that is to be awarded. The offer completion notification may also be comprised of a marketplace account identifier. In an embodiment, in response to receiving an offer completion notification, rewarding application server 170 uses the marketplace account identifier identified in the offer completion notification to locate a particular rewarding application account. Rewarding application server 170 then updates a balance value associated with the particular application based on the received offer value to be awarded.

In an embodiment, a device that is not linked to a marketplace account may also be able to earn virtual rewards for a marketplace account. For example, referring to FIG. 4, an offer could be completed on device 408 and the reward could be awarded to marketplace account 402. An award may be granted to marketplace account 402 by updating a balance value associated with marketplace account 402. In some embodiments, a user may only use an un-linked device to earn virtual rewards for a particular marketplace account by first logging in to the marketplace account.

In one embodiment, an un-linked device may only be able to complete reward offers that do not require the downloading, installation, or execution of an application. An un-linked device may be able to complete a reward offers by interacting with a web browser. For example, an un-linked device such as device 408 may be able to complete reward offers that require an offer action of watching a streaming advertisement online.

5.0 Implementation Mechanisms—Hardware Overview

Figure 5:
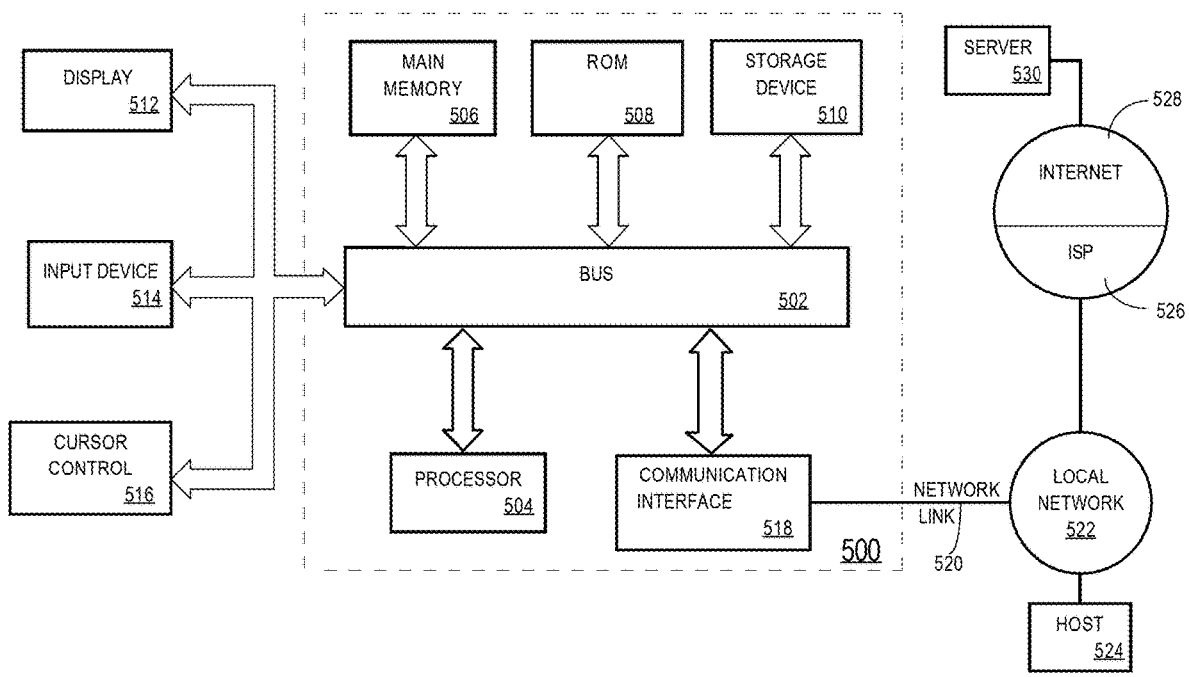
FIG. 5 illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    using a marketplace server computer, storing, at the marketplace server computer, application marketplace account information that identifies one or more computing devices that are linked to one or more marketplace accounts;
    wherein a first computing device and a second computing device are linked to a particular marketplace account;
    using the marketplace server computer, storing at the marketplace server, for one or more marketplace associated applications, interaction information comprising a plurality of entries, wherein the marketplace server adds an entry each time a device interacts with an instance of an application of the one or more marketplace associated applications and wherein the entry identifies the application and the device that interacted with the instance of the particular application;
    using the marketplace server computer, receiving at the marketplace server, from the first computing device, a request for a list of offer eligible applications;
    using the marketplace server computer, identifying a set of two or more applications associated with the first computing device by identifying, in the interaction information of the one or more marketplace associated applications, data indicating that the first computing device executed an instance of each application of the set of two or more applications;
    using the marketplace server computer, selecting a plurality of eligible applications including the set of two or more applications based, at least in part, on identifying the set of two or more applications associated with the first computing device;
    using the marketplace server computer, sending a list of the plurality of eligible applications including the set of two or more applications to the first computing device;
    using the marketplace server computer, receiving a selection of an eligible application of the list of selected eligible applications;
    using the marketplace server computer, identifying a plurality of offers for the selected eligible application, based, at least in part, on user account information of the particular marketplace account identifying capabilities of the second computing device;
    using the marketplace server computer, displaying a plurality of offer descriptions, each offer description of the plurality of offer descriptions describing a respective offer for the selected eligible application, wherein each respective offer offers a reward in exchange for a performance of an offer action.

2. The method of claim 1, wherein identifying the set of two or more applications associated with the first computing device comprises searching the interaction information for a device identifier identifying the first computing device.

3. The method of claim 1, wherein identifying the set of two or more applications associated with the first computing device comprises searching the interaction information for a device identifier identifying a device from a set of devices associated with an account of the first computing device.

4. The method of claim 1 further comprising:
    using the marketplace server computer, causing displaying of a list of eligible application descriptions on the first computing device, wherein each entry in the list of eligible application descriptions describes an application of the list of one or more selected eligible applications.

5. The method of claim 4 further comprising:
using the marketplace server computer, receiving a selection of an eligible application of the list of one or more selected eligible applications;
using the marketplace server computer, causing displaying of a plurality of offer descriptions on the first computing device, each offer description of the plurality of offer descriptions describing a respective offer for the selected eligible application, wherein each respective offer offers a reward in exchange for a performance of an offer action;
using the marketplace server computer, receiving a selection of a particular offer from the respective offers;
using the marketplace server computer, determining that a user of the first computing device has performed a particular offer action associated with the particular offer;
in response to determining that the user has performed the particular offer action, awarding the user a reward associated with the particular offer.

6. The method of claim 5, wherein the selected eligible application is not installed on the first computing device and is installed on a device associated with an account of the first computing device.

7. The method of claim 5, wherein the offer descriptions are displayed in a particular order and the particular order is determined based on information associated with an account of the first computing device.

8. The method of claim 5, wherein the offer action comprises executing a promoted application;
wherein said selection of the particular offer was performed on an offer selection device;
wherein identifying, in the interaction information, data indicating that the user has performed the particular offer action comprises:
accessing interaction information for the promoted application that identifies a plurality of devices that executed the particular application;
based on the accessed interaction information, determining that the promoted application was executed by the offer selection device.

9. The method of claim 5, wherein the reward associated with the particular offer is a particular amount of virtual reward for use with the selected eligible application;
wherein awarding the user the reward comprises sending a message to a server associated with the selected eligible application indicating an amount to be awarded.

10. The method of claim 5, wherein the reward is a particular amount of virtual reward for use with the selected eligible application;
wherein awarding the user the offered reward comprises updating a value associated with the first computing device.

11. The method of claim 5, wherein the reward is a particular amount of a universal reward that is redeemable in a plurality of applications of the one or more marketplace associated applications.

12. The method of claim 1, wherein the one or more selected eligible applications are identified by selecting one or more applications from the set of two or more applications associated with the first computing device that were executed within a particular time period.

13. The method of claim 1, wherein the first computing device is any of a smartphone, a tablet computer, a netbook computer, a laptop computer, or a desktop computer.

14. A non-transitory computer-readable storage medium comprising one or more sequences of instructions which when executed by one or more processors cause the one or more processors to perform:
storing, at a marketplace server computer, application marketplace account information that identifies one or more portable computing devices that are linked to one or more marketplace accounts;
wherein a first computing device and a second computing device are linked to a particular marketplace account;
storing at a marketplace server, for one or more marketplace associated applications, interaction information comprising a plurality of entries, wherein the marketplace server adds an entry each time a device interacts with an instance of an application of the one or more marketplace associated applications and wherein the entry identifies the application and the device that interacted with the instance of the particular application;
receiving at the marketplace server, from the first computing device, a request for a list of offer eligible applications;
identifying a set of two or more applications associated with the first computing device by identifying, in the interaction information of the one or more marketplace associated applications, data indicating that the first computing device executed an instance of each application of the set of two or more applications;
selecting a plurality of eligible applications including the set of two or more applications based, at least in part, on identifying the set of two or more applications associated with the first computing device;
sending a list of the plurality of eligible applications including the set of two or more applications to the first computing device;
receiving a selection of an eligible application of the list of selected eligible applications;
identifying a plurality of offers for the selected eligible application, based, at least in part, on user account information of the particular marketplace account identifying capabilities of the second computing device;
displaying a plurality of offer descriptions, each offer description of the plurality of offer descriptions describing a respective offer for the selected eligible application, wherein each respective offer offers a reward in exchange for a performance of an offer action.

15. The non-transitory computer-readable storage medium of claim 14, wherein the instructions that cause identifying the set of two or more applications associated with the first computing device further comprise instructions that cause searching the interaction information for a device identifier identifying the first computing device.

16. The non-transitory computer-readable storage medium of claim 14, wherein instructions that cause identifying the set of two or more applications associated with the first computing device further comprise instructions that cause searching the interaction information for a device identifier identifying a device from a set of devices associated with an account of the first computing device.

17. The non-transitory computer-readable storage medium of claim 14 further comprising instructions which when executed cause:
using the marketplace server computer, causing displaying of a list of eligible application descriptions on the first computing device, wherein each entry in the list of eligible application descriptions describes an application of the list of one or more selected eligible applications.

18. The non-transitory computer-readable storage medium of claim 17 further comprising instructions which when executed cause:
using the marketplace server computer, receiving a selection of an eligible application of the list of one or more selected eligible applications;
using the marketplace server computer, causing displaying of a plurality of offer descriptions on the first computing device, each offer description of the plurality of offer descriptions describing a respective offer for the selected eligible application, wherein each respective offer offers a reward in exchange for a performance of an offer action;
using the marketplace server computer, receiving a selection of a particular offer from the respective offers;
using the marketplace server computer, determining that a user of the first computing device has performed a particular offer action associated with the particular offer;
in response to determining that the user has performed the particular offer action, awarding the user a reward associated with the particular offer.

19. The non-transitory computer-readable storage medium of claim 18, wherein the selected eligible application is not installed on the first computing device and is installed on a device associated with an account of the first computing device.

20. The non-transitory computer-readable storage medium of claim 18, wherein the offer descriptions are displayed in a particular order and the particular order is determined based on information associated with an account of the first computing device.

21. The non-transitory computer-readable storage medium of claim 18, wherein the offer action comprises executing a promoted application;
wherein said selection of the particular offer was performed on an offer selection device;
wherein identifying, in the transaction information, data indicating that the user has performed the action comprises:
accessing interaction information for the promoted application that identifies a plurality of devices that executed the particular application;
based on the accessed interaction information, determining that the promoted application was executed by the offer selection device.

22. The non-transitory computer-readable storage medium of claim 18, wherein the reward associated with the particular offer is a particular amount of virtual reward for use with the selected eligible application;
wherein awarding the user the reward comprises sending a message to a server associated with the selected eligible application indicating an amount to be awarded.

23. The method of claim 18, wherein the reward is a particular amount of virtual reward for use with the selected eligible application;
wherein awarding the user the offered reward comprises updating a value associated with the first computing device.

24. The non-transitory computer-readable storage medium of claim 18, wherein the reward is a particular amount of a universal reward that is redeemable in a plurality of applications of the one or more marketplace associated applications.

25. The non-transitory computer-readable storage medium of claim 14, the one or more selected eligible applications are identified by selecting one or more applications from the set of two or more applications associated with the first computing device that were executed within a particular time period.

26. The non-transitory computer-readable storage medium of claim 14, wherein the first computing device is any of a smartphone, a tablet computer, a netbook computer, a laptop computer, or a desktop computer.

* * * * *